United States Patent [19]

Vitale

[11] 4,369,573

[45] Jan. 25, 1983

[54] PIPE CUTTER

[76] Inventor: Steven Vitale, 269 Greencroft Ave., Staten Island, N.Y. 10308

[21] Appl. No.: 194,219

[22] Filed: Oct. 6, 1980

[51] Int. Cl.³ ............................................ B23D 21/14
[52] U.S. Cl. ........................................................ 30/105
[58] Field of Search ................ 30/104, 103, 105, 106, 30/107, 108; 166/55.7, 55.8

[56] References Cited

U.S. PATENT DOCUMENTS

| | | | |
|---|---|---|---|
| 622,681 | 4/1899 | Hervey | 30/104 |
| 910,547 | 1/1909 | Kohler | 30/103 |
| 1,007,330 | 10/1911 | Browder | 30/104 |
| 1,734,439 | 11/1929 | Livergood | 30/103 |
| 2,538,890 | 1/1951 | Woodcock | 30/104 |
| 2,572,611 | 10/1951 | Glore | 30/104 |
| 2,638,667 | 5/1953 | Anderson | 30/107 |
| 2,840,902 | 7/1958 | Iannetti | 30/104 |
| 2,942,092 | 6/1960 | Cammann | 30/103 |
| 3,283,405 | 11/1966 | Braswell | 30/103 |
| 3,293,963 | 12/1966 | Carroll et al. | 83/54 |
| 3,939,561 | 2/1976 | Nichols | 30/107 |
| 4,177,558 | 11/1979 | Brown | 30/103 |
| 4,177,559 | 12/1979 | Anderson | 30/105 |

Primary Examiner—Harold D. Whitehead
Assistant Examiner—Robert A. Rose
Attorney, Agent, or Firm—Fitzpatrick, Cella, Harper & Scinto

[57] ABSTRACT

A pipe cutter for cutting the wall of a pipe from within the bore of the pipe. The cutter includes a blade and mechanisms for supporting the blade within the pipe to be cut, urging the blade outwardly of the pipe to engage it with the pipe wall and moving the blade relative to the pipe so that the blade cuts the wall. The cutter may include an expansible gripper assembly for engaging the pipe wall to retain the blade against movement axially of the pipe during the cutting operation. The gripper assembly is preferably operative upon operation of the blade movement mechanism. The blade may be a circular saw, the blade movement mechanism may be arranged to move the saw in orbital fashion around the axis of the pipe and the gripper assembly may be connected to the blade so that the gripper assembly prevents rotation of the saw about its axis during the cutting operation. When this arrangement is utilized, all of the teeth of the saw are successively engaged with the pipe wall.

25 Claims, 6 Drawing Figures

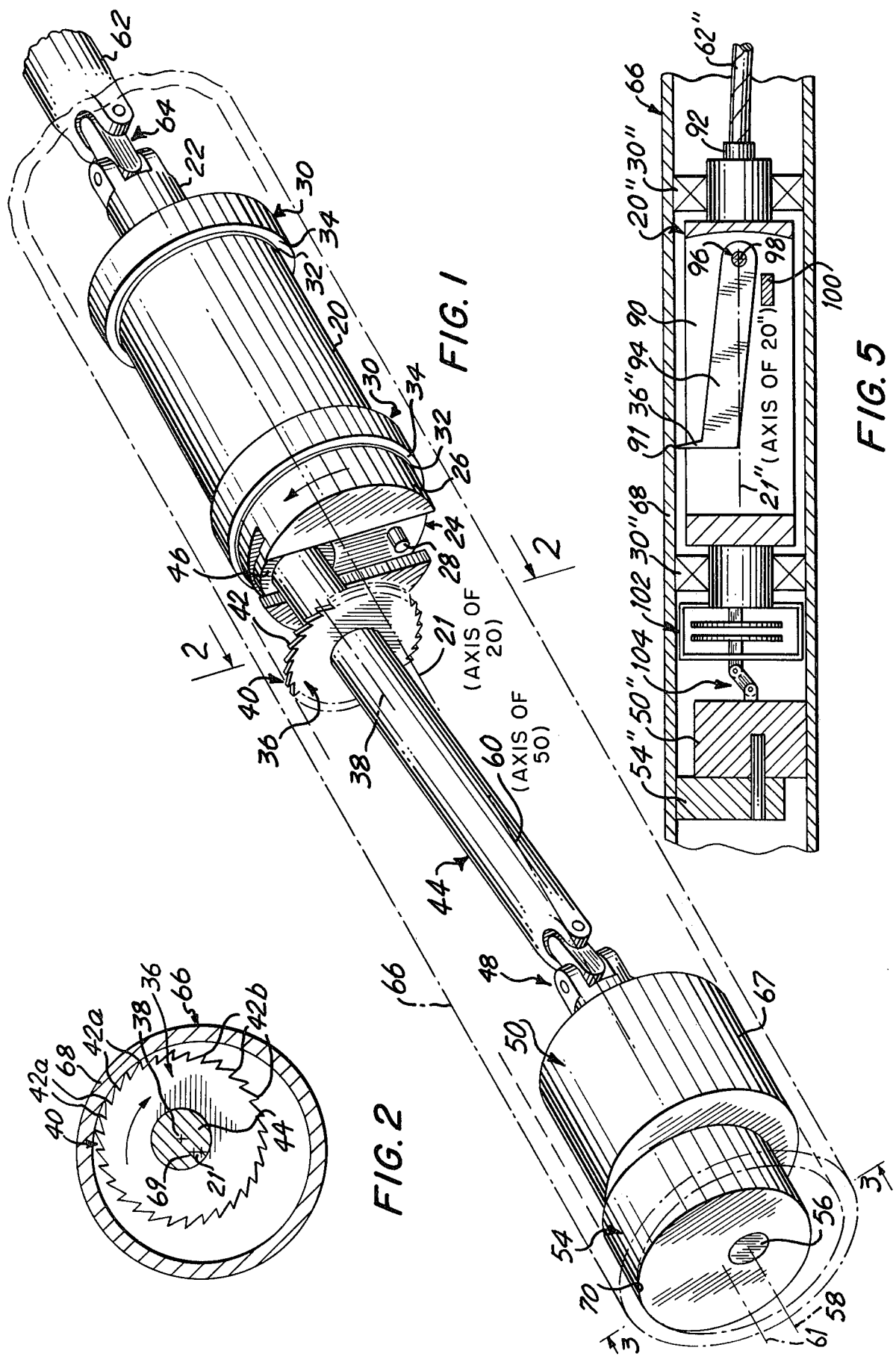

PIPE CUTTER

BACKGROUND OF THE INVENTION

The present invention relates to a tool for cutting the wall of a pipe from inside the pipe.

In various industrial applications, it is necessary to cut the wall of a pipe at a location along the pipe which is not accessible readily from outside of the pipe. For example, when gas utility service to a building is to be terminated permanently, the service pipe leading from the gas main to the building usually is severed adjacent the main. Ordinarily, the portion of the service pipe which must be cut is buried beneath the ground. Therefore, if the pipe is to be cut from the outside, it must first be exposed by excavation. Such excavation is inconvenient and expensive. By contrast, if the pipe can be cut from the inside by a cutter disposed within the bore of the pipe, there will be no need to expose the outside of the pipe and hence no need for excavation.

Various devices have been proposed for cutting a pipe from the inside. As described in U.S. Pat. No. 3,293,963, issued Dec. 27, 1966 to J. J. Carroll et al., one such device includes a circular saw blade. A motor is provided to power the circular saw blade in rotation about its own axis; the motor and saw blade are placed into the pipe and retained against movement axially of the pipe by a hydraulically actuated gripper assembly which engages the pipe wall. Another hydraulically actuated device moves the circular saw radially of the pipe so that the circular saw cuts through the wall of the pipe at one spot. A hydraulic rotary actuator then swings the blade about the axis of the pipe after the blade has penetrated the pipe wall to extend the cut around the pipe.

Another internal pipe cutter is described in U.S. Pat. No. 4,177,558, issued Dec. 11, 1979 to T. G. Brown. This cutter includes a housing, a shaft rotatably mounted to the housing and a circular saw blade coaxially mounted to the shaft. In operation, the housing is positioned outside of the pipe adjacent an open end thereof so that the shaft protrudes into the pipe and the blade is positioned within the pipe. The shaft and blade are rotated, as by a motor, and the housing is manipulated to force the blade into engagement with the wall of the pipe and move the blade about the periphery of the pipe.

Another form of pipe cutter, described in U.S. Pat. No. 3,283,405, issued Nov. 8, 1966 to S. P. Braswell, incorporates a drive shaft, a plurality of cutting blades connected to the drive shaft for rotation therewith and means for forcing the blades radially outwardly within the pipe to engage them with the wall of the pipe in response to axial displacement of the drive shaft. A pipe wall gripping device is provided, such device being actuated by axial displacement of the drive shaft.

The pipe cutting device disclosed in U.S. Pat. No. 1,068,991, issued July 29, 1913 to W. E. Dunkerley et al, incorporates a body and a blade mounted to the body for pivoting motion about an axis parallel to the axis of the body. The body is inserted into the pipe to be cut and the body is rotated on its axis. Centrifugal force causes the blade to swing outwardly from the body and engage the wall of the pipe.

Other internal pipe and tube cutters are described in the following U.S. Pat. Nos. 1,007,330; 1,499,429; 2,538,890; and 3,939,561.

SUMMARY OF THE INVENTION

The present invention provides a pipe cutter which can be operated within a pipe of relatively small diameter, and which can be operated to cut the wall of such a pipe at a substantial distance from the end of the pipe. Merely by way of example, one pipe cutter according to the present invention can be inserted into a pipe of $1\frac{1}{2}$ inches inside diameter and can be successfully operated to cut through the wall of such pipe at a distance of 20 feet or more from the end of the pipe.

The present invention also provides a pipe cutter which can be advanced along the bore of a pipe past bends and fittings to the location where the cut is desired. Pipe cutters according to the present invention can be successfully operated despite the presence of such obstructions between the end of the pipe where the cutter is inserted into the bore and the location where the cut is desired.

A pipe cutter according to the present invention includes a blade, means for supporting the blade within the pipe to be cut, and blade engagement means for urging the blade outwardly within the pipe to engage the blade with the wall of the pipe. Blade movement means are provided for moving the blade relative to the pipe wall while the blade is engaged therewith. The cutter also preferably includes gripper means formed separately from the blade for engaging the wall of the pipe in response to actuation of the blade movement means. The gripper means limit displacement of the blade along the axis of the pipe during the cutting operation so that the blade will not cut any wider kerf than is necessary.

Preferably, the blade movement means includes a drive body, means for rotatably supporting the drive body within the pipe to be cut, and means for moving the blade relative to the pipe wall in response to rotation of the drive body. The gripper means are preferably arranged to engage the wall of the pipe in response to rotation of the drive body and the blade engagement means are preferably arranged to urge the blade against the wall of the pipe in response to rotation of the drive body. Thus, the entire cutter can be operated by rotating the drive body.

Such a cutter may be connected to a flexible shaft, and advanced into the pipe with the flexible shaft trailing behind so that when the cutter is disposed at the desired cutting location the trailing end of the shaft is adjacent to an open end of the pipe and accessible through such open end. The accessible end of the shaft is rotated and such rotation is transmitted through the shaft to the cutter to operate it. It is unnecessary to transmit any axial motion along the shaft to operate the cutter. Therefore, a relatively limber flexible shaft which is not well suited to accurate transmission of axial motions can be successfully utilized.

A pipe cutter of the present invention may include a blade having a blade axis and a cutting edge extending around such blade axis. The blade engagement means preferably are arranged to urge the blade outwardly of the pipe so that the cutting edge of the blade bears on the wall of the pipe and the blade axis is displaced from the axis of the pipe. The blade movement means preferably move the blade axis about the axis of the pipe, so that the blade orbits about the pipe axis. Means for limiting rotation of the blade about the blade axis preferably are provided. Thus, various points on the cutting edge of the blade are brought into engagement with the pipe wall as the blade orbits about the pipe axis. For example, if the blade is a circular saw having a cutting edge which consists of a plurality of teeth disposed on the periphery of the blade, all of the teeth will be successively engaged with the pipe wall during each orbital motion of the blade about the pipe axis. Therefore, the wear on the blade will be distributed among all of the teeth, and the device can therefore be operated at a relatively rapid cutting rate without causing the teeth to wear at an unacceptable rate.

Other objects, features and advantages of the present invention will be more readily apparent from the detailed description of the preferred embodiments set forth below when read in conjunction with the accompanying drawings.

BRIEF DESCRIPTION OF THE DRAWINGS

FIG. 1 is a schematic perspective view of a pipe cutter in accordance with a first embodiment of the present invention in conjunction with a portion of a pipe and a portion of a shaft.

FIG. 2 is a sectional view taken along line 2—2 in FIG. 1.

FIG. 5 is a schematic sectional view depicting a pipe cutter according to a third embodiment of the present invention in conjunction with a portion of a pipe and a portion of a shaft.

DETAILED DESCRIPTION OF THE PREFERRED EMBODIMENTS

Figure 6:
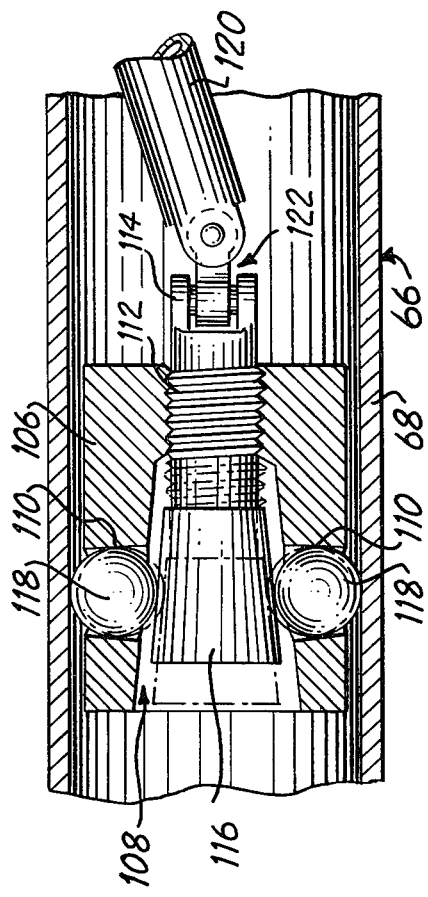
FIG. 6 is a fragmentary, schematic sectional view depicting a portion of a pipe cutter according to a fourth embodiment of the present invention in conjunction with a portion of a pipe.

As shown in FIG. 1, a pipe cutter according to a first embodiment of the present invention includes a generally cylindrical drive body 20 having an axis 21. Body 20 has a stub shaft 22 at a proximal end of the body and a generally T-shaped slot 24 in its axially opposite distal end face 26. Slot 24 extends transversely of axis 21. A stop pin 28 is fixedly connected to body 20 and is disposed in slot 24 remote from axis 21 of the body.

A pair of anti-friction bearings 30, each including an inner race 32 and an outer race 34, are connected to drive body 20, the inner race 32 of each such bearing being fixed to the drive body, the outer race being coaxial with the body and rotatable relative thereto.

The cutter includes a disc-like circular saw blade 36 having a blade axis 38 and a cutting edge 40 comprising a plurality of teeth 42 disposed around axis 38 remote therefrom. Blade 36 is fixedly coaxially mounted on a blade shaft 44. Blade shaft 44 in turn is rotatably connected to a disc-like shaft bearing 46. Shaft bearing 46 is slidably received in slot 24 for movement transversely of the axis 21 of drive body 20. There is sufficient clearance between shaft bearing 46 and the walls of slot 24 to allow the bearing to tilt within the slot. However, the walls of slot 24 limit motion of shaft bearing 46 relative to body 20 in the directions parallel to axis 21.

An expansible gripper assembly including a cylindrical gripper body 50 and a cylindrical jaw 54 is provided. Jaw 54 is pivotally mounted to gripper body 50 by a pin 56 so that jaw 54 may pivot relative to gripper body 50 about a jaw pivot axis 58 coincident with the axis of pin 56. Jaw pivot axis 58 is parallel to the axis 60 (FIG. 3) of gripper body 50 but is displaced therefrom. Likewise, jaw pivot axis 58 is parallel to the central axis 61 of jaw 54 but remote therefrom. Jaw 54 is substantially equal in diameter to gripper body 50, and jaw pivot axis 58 is substantially equidistant from gripper body axis 60 and from jaw central axis 61.

The end of shaft 44 opposite from bearing 46 is connected by a universal joint 48 to gripper body 50 so that any torque applied to shaft 44 about its axis will be transmitted to gripper body 50 and will tend to rotate gripper body 50 about its axis. However, shaft 44 is free to swing transversely of the axis of gripper body 50 so that shaft bearing 46 and the end of shaft 44 adjacent thereto can move transversely of drive body axis 21. Stop pin 28 limits movement of shaft bearing 46, and hence of shaft 44, so that the end of shaft 44 adjacent drive body 20 cannot swing past drive body axis 21.

In operation, stub shaft 22 (FIG. 1) may be connected to one end of a flexible shaft 62 by means of a universal joint 64. Cutter shaft 44, blade 36 and shaft bearing 46 are moved to a retracted position in which shaft bearing 46 rests against stop pin 28 and in which blade 36 does not protrude beyond the periphery of drive body 20. Jaw 54 is pivoted about axis 58 to a retracted position in which the axis 61 of the jaw is coincident with the axis 60 of gripper body 50. The cutter is then advanced into the bore of the pipe 66 with the shaft 62 trailing behind until the cutter is disposed within the bore at the desired location. The cutter may be propelled along the bore of the pipe during such advancement by any appropriate means. If the flexible shaft is stiff enough to transmit some axial force, the cutter may be propelled along the bore of the pipe by pushing on the flexible shaft. Because shaft bearing 46 is free to slide and tilt within slot 24, and universal joint 48 is free to swivel, the cutter can flex to clear bends and fittings in the pipe during its advancement along the bore of the pipe. Appropriate chamfers (not shown) may also be provided on the edges of the jaw, gripper body, drive body and bearing races to facilitate advancement of the cutter past obstructions in the pipe bore.

As seen in FIG. 1, the cutter is disposed within the bore of a pipe 66 at the location where the pipe is to be cut, the outer races 34 of bearings 30 resting against the wall of the pipe so that bearings 30 support drive body 20 within the bore of the pipe. As the outside diameter of outer races 34 is slightly smaller than the inside diameter of the pipe, outer races 34 and hence drive body 20 will not be precisely coaxial with the bore of the pipe when the races rest against the wall of such bore. However, as both outer races are of equal diameter and concentric with drive body 20, the axis 21 of drive body 20 will be substantially parallel to the axis of the bore of pipe 66. The peripheral surface 67 of gripper body 50 rests against the wall of pipe 66 and supports the gripper body within the pipe so that gripper body axis 60 is substantially parallel to the axis of the pipe.

A motor (not shown) is connected to flexible shaft 62 to rotate such shaft and hence rotate drive body 20 about its axis in the direction indicated by the arrow in FIG. 1. As drive body 20 rotates, shaft bearing 46, blade 36, and the end of blade shaft 44 adjacent the drive body move with the drive body about drive body axis 21, shaft 44 swinging on universal joint 48 to accommodate such motion. Centrifugal force on the blade shaft, blade and drive bearings flings these components outwardly from drive body axis 21 and hence radially outwardly within the pipe until the blade shaft, blade and shaft bearing reach the extended position illustrated in FIGS. 1 and 2. When these components are in such extended position, the cutting edge 40 of blade 36 bears on the wall 68 of pipe 66. Also, in this position, blade axis 38 is displaced from both drive body axis 21 and from the axis 69 of pipe 66. Thus upon rotation of drive body 20, blade axis 38 orbits about drive body axis 21 and hence moves around axis 69 of pipe 66, in the direction indicated by the arrow in FIG. 2.

As the cutting edge 40 of blade 38 is engaged with the wall 68 of pipe 66, the wall tends to retard motion of the cutting edge. That is, the wall applies a force to cutting edge 40 at the location of contact between the cutting edge and the pipe wall, such force being directed oppositely to the motion of the cutting edge. Such reaction force produces a torque on blade 36 about blade axis 38 in the direction opposite to the direction of the orbital motion, i.e., in the counterclockwise direction as seen in FIG. 2. Thus, as the cutting edge of the blade initially engages the pipe wall, blade 36 and shaft 44 rotate counterclockwise as seen in FIG. 2, thus driving gripper body 50 (FIG. 1) through universal joint 48 in rotation opposite to the rotation of drive body 20.

Upon such rotation of gripper body 50, centrifugal force pivots jaw 54 about jaw pivot axis 58. Since jaw 54 is eccentrically mounted about its pivot axis, upon rotation, the portion of the jaw farthest from its pivot axis 58 moves outwardly until it reaches the extended position depicted in FIGS. 1 and 3. In such position the peripheral surface 70 of the jaw bears on the wall 68 of pipe 66 at a location 72 (FIG. 3) on the opposite side of the pipe from the location 74 at which gripper body 50 bears on the pipe wall. Once the jaw and gripper body are engaged with the pipe wall in this manner, the torque applied to the gripper body by the blade through shaft 44 (FIG. 1) tends to tighten such engagement.

Figure 3:
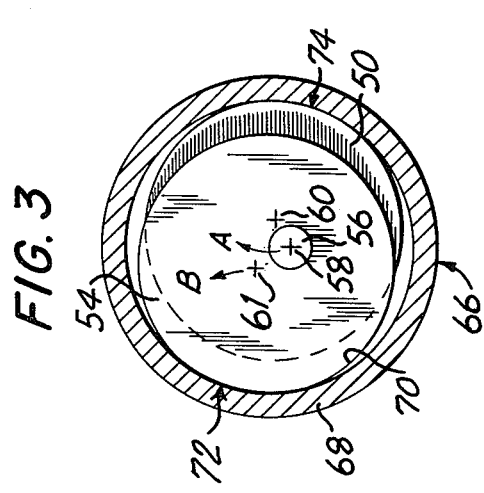
FIG. 3 is a sectional view taken along line 3—3 in FIG. 1.

As seen in FIG. 3, jaw pivot axis 58 is to the left of gripper body axis 60 and beneath the imaginary line connecting gripper body axis 60 with central axis 61 of jaw 54. The torque applied to the gripper body by the shaft tends to rotate it in the clockwise direction as seen in FIG. 3, thus tending to move jaw pivot axis 58 upwardly towards this imaginery line connecting the axes 60 and 61, such motion of jaw pivot axis 58 being indicated by the arrow A in FIG. 3. As jaw 54 is frictionally engaged with pipe wall 68 at location 72, jaw 54 tends to swing about location 72 upon such motion of jaw pivot axis 58. Such swinging motion of jaw 54 will move central axis 61 of jaw 54 upwardly and to the left as indicated by the arrow B in FIG. 3, thus increasing the distance between axis 61 and gripper body axis 60 and forcing the jaw and the gripper body into tighter engagement with the pipe wall. The distance between pivot axis 58 and gripper body axis 60, the distance between pivot axis 58 and jaw central axis 61, and the diameters of the jaw and the gripper body are selected to facilitate this tightening or "self-locking" action. The diameter of the pipe to be cut and the expected coefficients of friction between the pipe wall and the jaw and between the pipe wall and gripper body should also be considered in such selection.

Once the jaw and gripper body have become firmly engaged with the pipe wall the gripper body will be firmly anchored against any further rotation. As shaft 44 (FIG. 1) is connected to gripper body 50 by universal joint 48, shaft 44 cannot rotate about its axis once rotation of gripper body 50 about its axis has been arrested in this manner. Because blade 36 is fixedly mounted to and coaxial with shaft 44, rotation of blade 36 about blade axis 38 will also be arrested at this time. However, shaft 44 can continue to pivot about universal joint 48.

With continued rotation of drive body 20 on drive body axis 21, blade 36 continues its orbital motion about drive body axis 21. The centrifugal forces on blade 36, drive bearing 46 and shaft 44 continue to urge blade 36 outwardly within the pipe, into engagement with pipe wall 68. Such continued orbital motion of blade 36 about drive body axis 21 while rotation of blade 36 about blade axis 38 is arrested will bring successive portions of cutting edge 40 into engagement with the pipe wall.

As seen in solid lines in FIG. 2, blade 36 is disposed upwardly and to the right of drive body axis 21 and pipe axis 69. Teeth 42a, which are disposed upwardly and to the right of blade axis 38 are in contact with the pipe wall 68. Teeth 42b, disposed downwardly and to the right of blade axis 38 are not in contact with the pipe wall. The motion of blade 36 about drive body axis 21 and around pipe axis 69 will bring the blade to a position in which the blade axis 38 is disposed downwardly and to the right of drive body axis 21 and pipe axis 69. Teeth 42a will still be disposed upwardly and to the right of axis 38, and teeth 42b will still be disposed downwardly and to the right of axis 38. Thus, at such time teeth 42b will be in contact with pipe wall 68, but teeth 42a will be out of contact with the pipe wall. As will be appreciated, all of the teeth will be successively engaged with the pipe wall as the cutter orbits about the drive body axis. Because the cutting work is shared among the teeth, the life of the blade is prolonged. Also, the device can be operated at a relatively high speed without fear of overheating the teeth.

As stated above, the drive body and jaw are firmly engaged with the wall of the pipe while the blade is cutting through the wall. Such engagement of the drive body and jaw firmly anchors them against any axial sliding within the pipe. As the blade is connected to the gripper body by the universal joint 48 and shaft 44, the blade 36 is also restrained against movement axially of the pipe when the gripper body and jaw are so engaged with the wall of the pipe. Because the blade is so restrained, it will continually retrace the same path along the wall of the pipe as the drive body rotates. Therefore, the blade will cut through the pipe wall in a shorter time than would be required if the blade were continually wandering back and forth axially along the pipe.

Once the blade has penetrated through the wall of the pipe, the resistance of the blade to orbital motion about the drive body axis ordinarily will decrease drastically. This decrease in resistance ordinarily produces an increase in the rotational speed of the drive body, the flexible shaft 62 and the motor connected thereto, which can be detected readily by the operator. At this time, the operator can shut off the motor and rotate the flexible shaft by hand in the opposite direction from the direction of rotation utilized during the cutting operation. Upon such reverse rotation of the flexible shaft, the drive body 20 will rotate in the opposite direction from that indicated by the arrow in FIG. 1 and blade 36 will orbit about drive body axis 21 in the opposite direction from that indicated by the arrow in FIG. 2. That is, blade 36 will orbit about drive body axis 21 in the counterclockwise direction as seen in FIG. 2. Because the periphery of blade 36 is engaged in the kerf which the blade has cut through the pipe wall, such counterclockwise orbital motion of blade 36 causes the blade to rotate about blade axis 38 in the clockwise direction as seen in FIG. 2.

Such rotation of blade 36 will be transmitted through blade shaft 44 to gripper body 50 causing gripper body 50 to rotate counterclockwise as seen in FIG. 3, thereby releasing the engagement of jaw 54 with the pipe wall and bringing jaw 54 into alignment with gripper body 50. With continued reverse rotation of the drive body, the blade tends to climb out of the kerf, thus permitting the shaft 44 and blade 36 to move inwardly of the pipe until the blade axis 38 is adjacent drive body axis 21 and the blade is clear of the pipe wall. By pulling or pushing on the flexible shaft 64 the cutter can then be slid axially along the pipe either to position it for another cut or to remove it entirely from the pipe.

Figure 4:
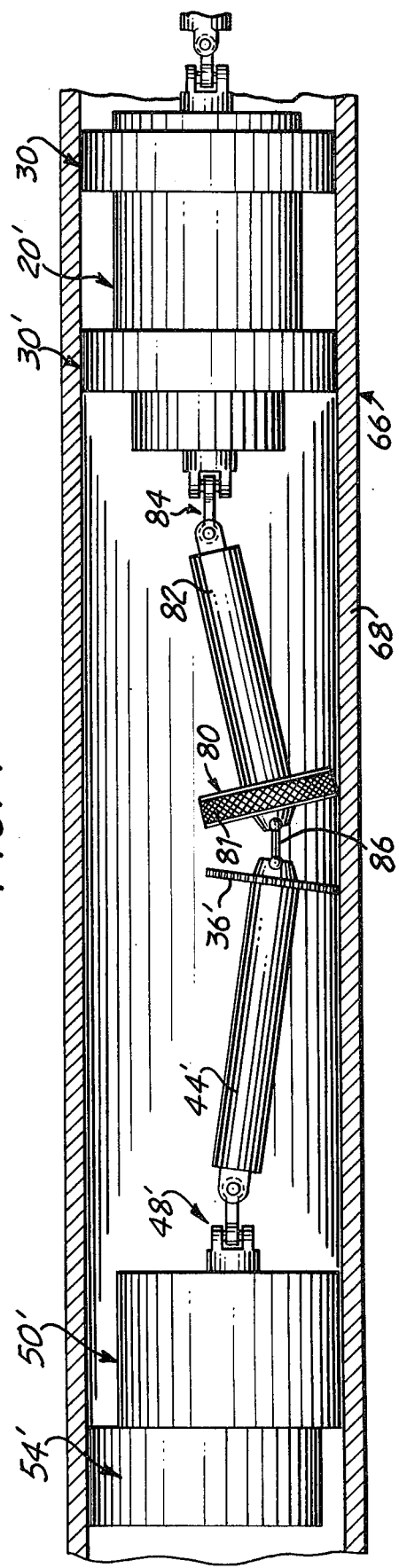
FIG. 4 is a schematic sectional view depicting a pipe cutter according to a second embodiment of the present invention in conjunction with a portion of a pipe.

A pipe cutter according to a second embodiment of the present invention is depicted in FIG. 4. This cutter incorporates drive body support bearings 30', blade 36', blade shaft 44', universal joint 48', gripper body 50' and jaw 54' similar to the corresponding components of the cutter described above with reference to FIGS. 1, 2 and 3. The cutter depicted in FIG. 4 includes a drive roller 80 having a knurled peripheral surface 81 and also includes a roller shaft 82. Drive roller 80 is fixedly coaxially mounted to roller shaft 82, which in turn is connected to drive body 20' through a universal joint 84. The adjacent ends of shafts 44' and 82 are connected to one another by a link 86. Link 86 permits rotation of each of such shaft about its own axis independent of rotation of the other one of such shafts, and link 86 also permits a small amount of motion of the adjacent shaft ends laterally of one another.

Upon rotation of drive body 20' about its axis, centrifugal force flings roller 80 and the adjacent end of shaft 82 outwardly within the pipe 66 until roller 82 bears on pipe wall 68. As blade shaft 44' is connected to roller shaft 82 by link 86, the end of blade shaft 44' adjacent roller shaft 82 also moves outwardly within the pipe until blade 36' bears on the pipe wall. Roller shaft 82 is driven in rotation about its axis through universal joint 84, thus rotating roller 80 about its axis. Peripheral surface 81 of roller 80 frictionally engages the pipe wall so that roller 80 rolls around the pipe, thus pulling the adjacent ends of roller shaft 82 and blade shaft 44' and hence blade 36' with it in orbital motion about the axis of the pipe. Upon such orbital motion, the blade 36' and blade shaft 44' will be subjected to centrifugal forces tending to force blade 36' outwardly into engagement with the pipe wall. The blade will rotate about its axis, thus rotating shaft 44' about its axis and rotating gripper body 50' about its axis to engage jaw 54' with the pipe wall in similar fashion to that described above with reference to FIGS. 1 through 3. Such engagement will arrest rotation of shaft 44' and blade 36' about their respective axes and the blade will cut through the wall of the pipe in similar fashion to that described above. Link 86 permits continued outward movement of shaft 44' as blade 36' cuts into the pipe wall.

A pipe cutter according to a third embodiment of the present invention is depicted in FIG. 5. Such pipe cutter includes a drive body 20" having a slot 90 extending through it transversely of its axis 21". A pair of bearings 30" are provided for supporting the drive body within the pipe so that drive body axis 21" is substantially parallel to the axis of the pipe 66. A fitting 92 is provided at the proximal end of drive body 20" (the end disposed towards the right in FIG. 5) for connecting drive body 20" to a flexible shaft 62". A blade 36" having a single point 91 is connected to drive body 20" by an arm 94 disposed within slot 90 and a pin 96 so that blade 36" is free to swing about blade pivot axis 98. Pin 96 and blade pivot axis 98 are transverse to drive body axis 21" and adjacent the proximal end of drive body 20". When arm 94 and blade 36" are in the extended position illustrated in FIG. 5, point 91 of blade 36" protrudes beyond the periphery of drive body 20" adjacent the distal end of the drive body (the end opposite from fitting 92). Arm 94 and blade 36" can swing inwardly of drive body 20 to a retracted position in which blade 36" is disposed entirely within slot 90 and hence does not protrude beyond the periphery of drive body 20". A stop 100 is disposed in slot 90, and arm 94 rests against this stop when arm 94 is in its retracted position. The stop limits the inward swing of arm 94 and blade 36" relative to drive body 20" so that the center of mass of arm 94 and blade 36" taken together will always be disposed on the same side of drive body axis 21" (above drive body axis 21" as seen in FIG. 5).

A gripper body 50" and jaw 54", similar to those described above are provided, the gripper body being connected to drive body 20" through a slip clutch 102 and a torque transmissive linkage 104.

Upon rotation of drive body 20" about drive body axis 21", centrifugal force flings arm 94 and blade 36" outwardly within the pipe 66, transversely of drive body axis 21" to engage the point 91 of blade 36" with wall 68 of the pipe. Such rotation of drive body 20" causes the blade to move along the wall of the pipe so that the blade cuts through the pipe wall. When drive body 20" is rotated, a torque is applied to gripper body 50" through slip clutch 102 and linkage 104, tending to rotate gripper body 50" about its axis, thus engaging gripper body 50" and jaw 54" with the pipe wall in a manner similar to that described above. Once the gripper body and jaw have become firmly engaged with the pipe wall, rotation of gripper body 50" about its axis will be arrested but clutch 102 will slip and thus permit continued rotation of drive body 20" about axis 21". Link 104 and clutch 102 are constructed so as to limit displacement of drive body 20" towards or away from gripper body 50". Therefore, when gripper body 50" and jaw 54" are engaged with the wall of the pipe, movement of drive body 20" and hence of blade 36" along the axis of the pipe will be limited.

After the pipe has been cut, rotation of shaft 64" is reversed to transmit a reverse torque to gripper body 50" and thus release the engagement of gripper body 50" and jaw 54" with the pipe wall.

As stated above, blade 36" is swingable about blade pivot axis 98, which axis is transverse to drive body axis 21". It is believed that this transverse arrangement of the blade pivot axis minimizes variations in the force with which blade 36" bears on the pipe wall during the cutting operation. As the tip of the blade traverses the pipe wall, drag forces are applied by the pipe wall to the blade at the blade tip. Such drag forces may vary depending upon the sharpness of the blade tip, the consistency of the pipe wall material and other factors.

The drag forces will be directed in the direction opposite to the direction of movement of the blade tip. With the transverse arrangement of the blade pivot axis illustrated in FIG. 5, such forces will always be directed substantially parallel to the blade pivot axis 98. Because the drag forces applied by the pipe wall to the blade tip are substantially parallel to the blade pivot axis, such forces do not produce any substantial torque on the blade and arm about blade pivot axis 98. Although the drag forces will produce substantial torques on the blade and the arm about axes perpendicular to blade pivot axis 98, such torques will not tend to swing the blade about axis 98. Therefore, the drag forces will not tend to urge blade 36" towards or away from pipe wall 68.

A pipe cutter according to a fourth embodiment of the present invention is partially depicted in FIG. 6. This pipe cutter is smaller to that described above with reference to FIGS. 1 through 3 except that it incorporates a different gripper assembly. The gripper assembly illustrated in FIG. 6 includes a cylindrical housing 106 having an axial bore 108 and a plurality of transverse bores 110 intersecting the axial bore. Axial bore 108 of housing 106 is provided with female threads 112 remote from transverse bores 110. A gripper shaft 114 is threadedly engaged with threads 112 and a conical cam 116 is fixed to the end of shaft 114 adjacent transverse bores 110. A lug 118 is disposed in each of the transverse bores 110. Transverse bores 110 are arranged to permit movement of lugs 118 between the extended positions illustrated in solid lines in FIG. 6 and the retracted positions illustrated in broken lines.

The blade shaft 120 of the cutter is connected to the end of shaft 112 remote from cam 116 by a universal joint 122, blade shaft 120 and universal joint 122 being similar to the corresponding blade shaft 44 and universal joint 48 described above with reference to FIGS. 1 through 3. Before the cutter is inserted into the pipe, the gripper shaft 114 and cam 116 are disposed in the disengaged position illustrated in broken lines in FIG. 6. When the cam is in this disengaged position, a relatively narrow portion of cam 116 is aligned with transverse bores 110 so that lugs 118 are free to move to their respective retracted positions. When lugs 118 are in their retracted positions, they do not protrude beyond the exterior surface of housing 106, and the cutter can be inserted into the pipe in similar fashion to that described above with reference to FIGS. 1 through 3.

Housing 106 initially rests against the wall 68 of the pipe 66. However, when the drive body (not shown) of the cutter is rotated, shaft 120 and the blade (not shown) mounted thereto move outwardly within the pipe until the blade engages the pipe wall. Upon engagement of the blade with the pipe wall, the reaction forces exerted by the pipe on the blade produce a torque on shaft 120 which is transmitted through universal joint 122 thus causing shaft 114 to rotate. Such rotation of shaft 114 in threads 112 causes shaft 114 and cam 116 to move axially within housing 106 to the engaged position illustrated in solid lines in FIG. 6, housing 106 being retained against rotation by frictional engagement with the pipe wall. When the cam is in this engaged position, a relatively wide portion of the cam is aligned with transverse bores 110 and the cam bears on lugs 118. Thus as the cam moves from its disengaged position to its engaged position, lugs 118 are forced outwardly of housing 106 until they engage the wall of the pipe. When lugs 118 are engaged with the pipe wall, friction between the lugs and cam 116 will prevent any further rotation of the cam and hence of gripper shaft 114 in the tightening direction, and hence will prevent any further rotation of blade shaft 120. Also, the engagement of lugs 118 with the pipe wall will anchor the cam and hence the entire cutter against axial movement within the pipe. As the pipe continually exerts a reaction force on the blade while the blade is cutting the pipe wall, a tightening torque will be continually applied to gripper shaft 114 during the cutting operation. Thus, lugs 118 will be continually urged into tight engagement with the pipe wall during the cutting operation. After the cut has been made, the rotation of the drive body is reversed, thus applying a reverse torque to shaft 120 and gripper shaft 114. The gripper shaft and cam 116 move back towards their disengaged position and thus release the engagement of lugs 118 with the pipe wall.

In a variation of the gripper assembly described above with reference to FIG. 6, the gripper shaft is mounted to the gripper housing so that the shaft can be rotated relative to the housing but cannot move axially relative thereto. Instead of the conical cam described above, a cam having a number of lobes equal to the number of lugs is utilized. When the cam is in its disengaged position, the lobes are not aligned with the transverse bores so that the lugs can move to their retracted positions. Upon rotation of the shaft, the cam is moved to an engaged position in which each of the lobes is aligned with one of the transverse bores. Thus, the lugs are forced outwardly from the housing by the cam upon rotation of the cam from its disengaged position to its engaged position. Preferably, in this embodiment, the surfaces of the lobes which bear on the lugs slope radially outwardly so that the torque applied to the shaft during the cutting action will continually urge the lugs outwardly of the housing and hence into firm engagement with the pipe wall.

The pipe cutters described above can be fabricated from conventional materials selected according to criteria of cost, strength, ease of fabrication, composition of the pipe being cut and compatability with environmental conditions. For example, the drive bodies, gripper bodies and shafts of the cutters described above can be fabricated from ordinary cold rolled steel and the blades of such cutters can be formed from hardened steel. The blades may be ordinary commercial types. A conventional small circular cutter of the type ordinarily employed in fine metal working can be employed as the blade of the pipe cutters described above with reference to FIGS. 1 through 4 and a conventional lathe bit or replaceable carbide tip can be utilized as the blade of the cutter described above with reference to FIG. 5.

As will be readily appreciated, numerous variations and combinations of the features described above can be utilized. Merely by way of example, any of the gripper assemblies described above can be utilized with any of the blade and drive body arrangements described above. Other gripper means can also be utilized. Also, the gripper means can be omitted if axial movement of the blade within the pipe can be tolerated or if other means are utilized to limit axial movement of the blade. For example, if the drive body is connected to a rigid shaft rather than a flexible shaft, axial movement of the drive body and hence axial movement of the blade can be limited by limiting axial movement of the drive shaft. If the gripper means are omitted from a cutter employing an orbital blade motion, such as the cutters described above with reference to FIGS. 1 through 4, other means should be provided to prevent rotation of the blade about its own axis. Also, although the blades utilized in the cutters described above with reference to FIGS. 1 through 4 are disc-like and have circular cutting edges, a blade having a noncircular cutting edge can also be utilized in such cutters. Moreover, although the blades described above have either a plurality of teeth or single point, knife-like blades or abrasive blades without such features can also be utilized.

It is not essential to provide bearings for supporting the drive body of the cutter without the pipe. The drive body may be supported within the pipe by direct contact between the peripheral wall of the drive body and the wall of the pipe. If such an arrangement is utilized, the peripheral wall surface of the drive body should preferably be hardened and lubricated to minimize wear and friction between the peripheral wall of the drive body and the pipe wall. Also, the drive body and gripper body need not be supported on axes parallel to the axis of the pipe.

In the embodiments described above with reference to FIGS. 1 through 6, the blade moves in a substantially circular path, such circular path extending in a plane substantially perpendicular to the axis of the pipe. This path of motion is preferred when a pipe is to be severed, as such motion of the blade will permit serverance of the pipe with the least amount of material removal. However, the blade can be moved in other paths. For example, an elliptical path disposed in a plane oblique to the axis of the pipe may be utilized. Also, although the cutters of the present invention have been illustrated in conjunction with common pipes having cylindrical bores, the cutters of the present invention can be utilized to cut pipes having other configurations.

As these and other variations and combinations of the features described above can be utilized without departing from the present invention as set forth in the claims, the foregoing description of the preferred embodiments should be taken by way of illustration rather than by way of limitation of the present invention.

What is claimed is:

1. A pipe cutter comprising:
  (a) a blade having a blade axis and a cutting edge remote from said blade axis;
  (b) means for supporting said blade within the pipe to be cut;
  (c) blade engagement means for urging said blade into engagement with the wall of the pipe and operative to engage said cutting edge with said wall;
  (d) blade movement means for moving said blade around the axis of the pipe while said blade is engaged therewith; and
  (e) gripper means formed separately from said blade for engaging the wall of the pipe in response to actuation of said blade movement means to limit displacement of said blade along the axis of the pipe, said gripper means being operative to engage the wall of the pipe upon application of a torque to said blade about said blade axis.

2. A pipe cutter as claimed in claim 1 in which said blade movement means includes a drive body and means for rotatably supporting said drive body within the pipe, said blade movement means being operative to move said blade radially upon rotation of said drive body.

3. A pipe cutter as claimed in claim 2 in which said blade engagement means is operative to engage the blade with the wall of the pipe in response to rotation of said drive body.

4. A pipe cutter as claimed in claim 1 in which said gripper means is operative to limit rotation of said blade about said blade axis.

5. A pipe cutter as claimed in claim 4 in which said cutting edge of said blade extends around said blade axis.

6. A pipe cutter as claimed in claim 5 in which said cutting edge includes a plurality of teeth.

7. A pipe cutter as claimed in claim 6 in which said cutting edge is substantially in the form of a circle, the axis of said circle being coincident with said blade axis.

8. A pipe cutter comprising:
  (a) a blade
  (b) means for supporting said blade within the pipe to be cut;
  (c) blade engagement means for urging the blade into engagement with the wall of the pipe;
  (d) blade movement means including a drive body and means for rotatably supporting said drive body within the pipe, said blade movement means being operative to move the blade radially upon rotation of said drive body and to cause said blade to orbit relative to the wall while the blade is engaged therewith; and
  (e) gripper means formed separately from the blade for engaging the wall of the pipe in response to actuation of said blade movement means to limit displacement of said blade along the axis of the pipe, said gripper means inclucing an expansible gripper assembly and means for operating said gripper assembly to engage it with the wall of the pipe upon rotation of said drive body in a first direction.

9. A pipe cutter as claimed in claim 8 in which said operating means is operative to release the engagement between said gripper assembly and the wall of the pipe upon rotation of said drive body in a second direction.

10. A pipe cutter as claimed in claim 9 in which said blade has a blade axis and a cutting edge remote from said blade axis, said blade engagement means being operative to engage said cutting edge with the wall of the pipe, said blade movement means being operative to move said blade axis around the axis of the pipe whereby the pipe applies a reaction force to the cutting edge of the blade and such reaction force produces a torque on the blade about said blade axis, said gripper assembly being connected to said blade, said gripper assembly being operative to engage and disengage the pipe in response to said torque.

11. A pipe cutter as claimed in claim 10 in which said blade support means includes a blade shaft, said blade being fixed to said blade shaft, a first end of said blade shaft being connected to said gripper assembly for transmission of torque from said blade to said gripper assembly, said blade shaft being pivotable relative to said gripper assembly about said first end.

12. A pipe cutter as claimed in claim 11 in which said drive body has a drive body axis, said drive body support means being operative to support said drive body so that said drive body is rotatable about said drive body axis, a second end of said shaft being connected to said drive body, said second end being movable transversely of said drive body axis.

13. A pipe cutter as claimed in claim 12 in which said drive body support means is operative to support said drive body so that the drive body axis is substantially parallel to the axis of the pipe.

14. A pipe cutter as claimed in claim 13 in which said secnd end of said blade shaft is slidable within the drive body.

15. A pipe cutter as claimed in claim 14 further comprising a shaft bearing connected to said blade shaft at its second end, said shaft bearing being slidably mounted to said drive body, said blade shaft being connected to said drive body by way of said shaft bearing, said blade shaft being rotatable relative to said shaft bearing.

16. A pipe cutter as claimed in claim 12 in which said blade movement means includes a roller shaft, one end of said roller shaft being connected to said drive body for rotation of said roller shaft about its axis upon rotation of said drive body about said drive body axis, said roller shaft being swingable transversely of said drive body axis, said blade movement means also including a roller mounted to said roller shaft for rotation therewith, the end of said roller shaft remote from said drive body being connected to the second end of said blade shaft, said shafts being independently rotatable about their respective axes.

17. A pipe cutter as claimed in claim 9 or claim 12 in which said gripper assembly includes a gripper body having a gripper body axis and a jaw mounted to said gripper body for movement transversely of said gripper body axis, said jaw being movable to an extended position in which said jaw protrudes beyond the periphery of said gripper body, said jaw and said gripper body bearing on the pipe wall when said jaw is in said extended position.

18. A pipe cutter as claimed in claim 17 in which said jaw is mounted to said gripper body for pivotal movement relative thereto about an eccentric jaw pivot axis parallel to said gripper body axis but remote therefrom.

19. A pipe cutter as claimed in claim 9 or claim 12 in which said gripper assembly includes a housing and a lug mounted to said housing, said lug being movable relative to said housing between a retracted position and an extended position in which said lug protrudes from said housing, said gripper assembly also including a cam movably mounted to said housing for movement between an engaged position and a disengaged position, said cam bearing on said lug to urge it towards said extended position when said cam is in said engaged position, said operating means being operative to move said cam between said engaged and disengaged positions.

20. A pipe cutter as claimed in claim 9 in which said operating means includes clutch means for transmitting torque from said drive body to said gripper assembly, said clutch means being operative to permit rotation of said drive body when said gripper assembly is engaged with the wall of the pipe.

21. A pipe cutter comprising:
(a) a circular saw blade having a blade axis and a cutting edge including a plurality of teeth extending around said blade axis;
(b) means for supporting said blade within the pipe to be cut;
(c) blade engagement means for displacing said blade axis from the axis of the pipe thereby causing said cutting edge to engage the wall of said pipe;
(d) means for limiting rotation of said blade about said blade axis; and
(e) means for orbiting said blade axis around the axis of the pipe.

22. A pipe cutter as claimed in claim 21 in which the axis of said circle is coincident with said blade axis.

23. A pipe cutter comprising:
(a) a body having a body axis;
(b) means for supporting said body within the pipe to be cut so that said body is rotatable about said body axis; and
(c) a blade swingably connected to said body for orbital movement relative thereto about a pivot axis transverse to said body axis, said blade being movable between a retracted position and an extended position in which said blade protrudes beyond the periphery of said body.

24. A pipe cutter as claimed in claim 23 further comprising gripper means operatively associated with said body for engaging the wall of the pipe to limit displacement of said body along the axis of said pipe, said gripper means being operative to engage such wall upon rotation of said body about said body axis.

25. A pipe cutter as claimed in claim 23 in which said body support means is operative to support said body so that said body axis is substantially parallel to the axis of the pipe.

* * * * *

UNITED STATES PATENT AND TRADEMARK OFFICE
CERTIFICATE OF CORRECTION

PATENT NO. : 4,369,573
DATED : January 25, 1983
INVENTOR(S) : STEVEN VITALE

It is certified that error appears in the above-identified patent and that said Letters Patent is hereby corrected as shown below:

Column 9, line 13, "smaller" should be --similar--;
        line 68, "hance" should be --hence--.
Column 11, line 6, "without" should be --within--.

Claim 7, line 1, "6" should be --5--.
Claim 14, line 1, "13" should be --12--;
        line 2, "secnd" should be --second--.

Signed and Sealed this

Twelfth Day of April 1983

[SEAL]

Attest:

GERALD J. MOSSINGHOFF

Attesting Officer     Commissioner of Patents and Trademarks